(12) United States Patent
Terao et al.

(10) Patent No.: US 9,053,751 B2
(45) Date of Patent: Jun. 9, 2015

(54) SOUND AND IMAGE SEGMENT SORTING DEVICE AND METHOD

(75) Inventors: Makoto Terao, Tokyo (JP); Takafumi Koshinaka, Tokyo (JP)

(73) Assignee: NEC CORPORATION, Tokyo (JP)

(*) Notice: Subject to any disclaimer, the term of this patent is extended or adjusted under 35 U.S.C. 154(b) by 343 days.

(21) Appl. No.: 13/510,811

(22) PCT Filed: Nov. 5, 2010

(86) PCT No.: PCT/JP2010/069694
§ 371 (c)(1),
(2), (4) Date: May 18, 2012

(87) PCT Pub. No.: WO2011/062071
PCT Pub. Date: May 26, 2011

(65) Prior Publication Data
US 2012/0233168 A1 Sep. 13, 2012

(30) Foreign Application Priority Data

Nov. 19, 2009 (JP) ................................. 2009-264107

(51) Int. Cl.
*G06F 17/30* (2006.01)
*G11B 27/28* (2006.01)
(52) U.S. Cl.
CPC .......... *G11B 27/28* (2013.01); *G06F 17/30705* (2013.01)
(58) Field of Classification Search
CPC .......... G06F 17/30244; G06F 17/3074; G06F 17/30705; G06F 17/3071
USPC ......................................... 707/737–738, 748
See application file for complete search history.

(56) References Cited

U.S. PATENT DOCUMENTS

| 6,710,822 B1* | 3/2004 | Walker et al. ................. 348/722 |
| 2010/0172591 A1* | 7/2010 | Ishikawa ...................... 382/224 |

FOREIGN PATENT DOCUMENTS

| JP | 2004-247913 A | 9/2004 |
| JP | 2005-80209 A | 3/2005 |
| WO | 2008/146616 A1 | 12/2008 |

OTHER PUBLICATIONS

Jun'Ya Kamura, "Improvement of Division for X-Means Algorithm", Dai 8 Kai Forum on Information Technology, 2009, pp. 161-162, vol. 2.

(Continued)

*Primary Examiner* — Thu-Nguyet Le
(74) *Attorney, Agent, or Firm* — Sughrue Mion, PLLC

(57) ABSTRACT

A sound segment sorting unit (103) sorts the sound segments of a video. An image segment sorting unit (104) sorts the image segments of the video. A multiple sorting result generation unit (105) generates a plurality of sound segment sorting results and/or a plurality of image segment sorting results. A sorting result pair generation unit (106) generates a plurality of sorting result pairs of the sorting results as the candidates of the optimum segment sorting result of the video. A sorting result output unit (108) compares the sorting result comparative scores of the sorting result pairs calculated by a sorting result comparative score calculation unit (107) and thus outputs a sound segment sorting result and an image segment sorting result having good correspondence. This allows to accurately sort, for each object, a plurality of sound segments and a plurality of image segments contained in the video without adjusting parameters in advance.

18 Claims, 11 Drawing Sheets

(56) References Cited

OTHER PUBLICATIONS

Takahiro Usuda et al., "Improvement of Cut Detection by Audio Signals Analysis with a Fuzzy Theory", ITE Technical Report, 1997, pp. 19-24, Vo. 21, No. 78.

S.S. Chen et al., "Automatic transcription of Broadcast News", Speech Communication, 2002, pp. 69-87, vol. 37.

Yo Narita et al., "A Note on Accurate Scene Segmentation Utilizing Speech Recognition—Introduction of Video Structure Analysis Using Object Matching", ITE Technical Report, 2009, pp. 17-20, vol. 33, No. 33.

International Search Report for PCT/JP2010/069694 dated Dec. 7, 2010.

* cited by examiner

| WEIGHT | WITHOUT IMAGE SEGMENT | WITH IMAGE SEGMENT |
|---|---|---|
| WITHOUT SOUND SEGMENT | 0 | 0 |
| WITH SOUND SEGMENT | -1 | 1 |

FIG. 9A

| SORTING RESULT PAIR A1-B1 | IMAGE CLUSTER B1-1 | IMAGE CLUSTER B1-2 | IMAGE CLUSTER B1-3 |
|---|---|---|---|
| SOUND CLUSTER A1-1 | (40) | 20 | -40 |

FIG. 9B

| SORTING RESULT PAIR A2-B1 | IMAGE CLUSTER B1-1 | IMAGE CLUSTER B1-2 | IMAGE CLUSTER B1-3 |
|---|---|---|---|
| SOUND CLUSTER A2-1 | (40) | 0 | -30 |
| SOUND CLUSTER A2-2 | 0 | (20) | -10 |

FIG. 9C

| SORTING RESULT PAIR A3-B1 | IMAGE CLUSTER B1-1 | IMAGE CLUSTER B1-2 | IMAGE CLUSTER B1-3 |
|---|---|---|---|
| SOUND CLUSTER A3-1 | 20 | 0 | (-10) |
| SOUND CLUSTER A3-2 | 0 | (20) | -10 |
| SOUND CLUSTER A3-3 | (20) | 0 | -20 |

FIG. 9D

| SORTING RESULT PAIR A1-B2 | IMAGE CLUSTER B2-1 | IMAGE CLUSTER B2-2 | IMAGE CLUSTER B2-3 | IMAGE CLUSTER B2-4 |
|---|---|---|---|---|
| SOUND CLUSTER A1-1 | 0 | (20) | -40 | -20 |

FIG. 9E

| SORTING RESULT PAIR A2-B2 | IMAGE CLUSTER B2-1 | IMAGE CLUSTER B2-2 | IMAGE CLUSTER B2-3 | IMAGE CLUSTER B2-4 |
|---|---|---|---|---|
| SOUND CLUSTER A2-1 | (0) | 0 | -30 | 0 |
| SOUND CLUSTER A2-2 | 0 | (20) | -10 | -20 |

FIG. 9F

| SORTING RESULT PAIR A3-B2 | IMAGE CLUSTER B2-1 | IMAGE CLUSTER B2-2 | IMAGE CLUSTER B2-3 | IMAGE CLUSTER B2-4 |
|---|---|---|---|---|
| SOUND CLUSTER A3-1 | (0) | 0 | -10 | 0 |
| SOUND CLUSTER A3-2 | 0 | (20) | -10 | -20 |
| SOUND CLUSTER A3-3 | 0 | 0 | -20 | (0) |

SOUND AND IMAGE SEGMENT SORTING DEVICE AND METHOD

CROSS REFERENCE TO RELATED APPLICATIONS

This application is a National Stage of International Application No. PCT/JP2010/069694 filed Nov. 5, 2010, claiming priority based on Japanese Patent Application No. 2009-264107 filed Nov. 19, 2009, the contents of all of which are incorporated herein by reference in their entirety.

TECHNICAL FIELD

The present invention relates to a sound and image processing technique and, more particularly, to a sound and image segment sorting technique of sorting, for each object, a plurality of sound segments and a plurality of image segments contained in a video.

BACKGROUND ART

Non-patent literature 1 describes an example of a technique of sorting a plurality of sound segments formed from the voices of a plurality of speakers for each speaker. In non-patent literature 1, first, all sound segments are defined as different clusters. Then, merging a pair of similar clusters is successively repeated, thereby clustering the sound segments. Whether to merge two clusters is determined by modeling the two clusters before and after merge and comparing the BIC (Bayesian Information Criterion) of the two models. The technique of non-patent literature 1 uses a model assuming that the feature amounts of samples included in each cluster comply with a single Gaussian distribution. As the feature amount, for example, an MFCC (Mel-Frequency Cepstrum Coefficient) often used in speech recognition is used. At this time, BIC for a given clustering result $(c_1, c_2, \ldots, c_K)$ is represented by

[Mathematical 1]

$$BIC(c_1, c_2, \ldots, c_K; K) = -\sum_{k=1}^{K} \log P(X_k \mid \mu_k, \Sigma_k) + \lambda \cdot \frac{K}{2}\left(d + \frac{d(d+1)}{2}\right)\log N \quad (1)$$

where K is the number of clusters, $P(X_k|\mu_k, \Sigma_k)$ is the likelihood of the samples included in the kth cluster, $\lambda$ is the penalty coefficient which is normally 1, d is the number of dimensions of the feature amount, and N is the total number of samples. The first term represents the goodness of fit of the samples to the model. The second term represents the penalty to the complexity of the model. The penalty increases as the number of clusters increases. The smaller the value of BIC is, the more preferable the model is. In general, when the model becomes more complex, the goodness of fit (likelihood) of the samples increases. Since the BIC gives a penalty to the complexity of a model, a model having appropriate complexity can be selected.

Merging two clusters when a change amount $\Delta BIC$ of the BIC upon merging the two clusters satisfies $\Delta BIC<0$ is repeated, thereby performing clustering. Let $X_1$ be the set of samples included in a cluster $c_1$, and $X_2$ be the set of samples included in a cluster $c_2$. when the two clusters are merged, the change amount $\Delta BIC$ of the BIC is given by

[Mathematical 2]

$$\Delta BIC = \log \frac{P(X_1 \mid \mu_1, \Sigma_1) \cdot P(X_2 \mid \mu_2, \Sigma_2)}{P(X_1, X_2 \mid \mu, \Sigma)} - \frac{\lambda}{2}\left(d + \frac{d(d+1)}{2}\right)\log N \quad (2)$$

where $P(X_1|\mu_1, \Sigma_1)$ and $P(X_2|\mu_2, \Sigma_2)$ are the likelihood of the samples included in the cluster $c_1$ and the likelihood of the samples included in the cluster $c_2$, and $P(X_1, X_2|\mu, \Sigma)$ is the likelihood of the samples when the two clusters are merged.

Cluster merging is successively repeated in this way. The cluster merging ends when $\Delta BIC \geq 0$ holds in every cluster pair merging. The number of clusters is thus automatically determined.

Patent literature 1 describes a technique of analyzing an input video, sorting image segments and sound segments, and associating an image segment and a sound segment, which include the same object, with each other based on the similarity of the segments. In patent literature 1, a feature amount is calculated for each of the image segments and sound segments of the input video. The image segments or sound segments are input into groups. The obtained image segment groups and sound segment groups are associated based on the temporal simultaneity of them. As a result, groups of sound segments and image segments sorted for each object are obtained.

RELATED ART LITERATURE

Patent Literature

Patent Literature 1: PCT(WO) 2008-146616

Non-Patent Literature

Non-Patent Literature 1: S. S. Chen, E. Eide, M. J. F. Gales, R. A. Gopinath, D. Kanvesky, P. Olsen, "Automatic transcription of Broadcast News," Speech Communication, Vol. 37, pp. 69-87, 2002.

DISCLOSURE OF INVENTION

Problem to be Solved by the Invention

However, the technique of non-patent literature 1 described above needs to adjust the penalty coefficient $\lambda$ for each problem to estimate the number of clusters equal to the true number of speakers. If the estimated number of clusters is larger than the true number of speakers, the voice of a single speaker is divided into a plurality of clusters. If the estimated number of clusters is smaller than the true number of speakers, the voices of different speakers are included in a single cluster. In either case, no preferable result is obtained as the result of sorting a plurality of sound segments for respective speakers.

The above problem arises because the assumed model cannot appropriately express the properties of speakers. For this reason, even when a model that minimizes the BIC is selected, a model including clusters in number different from the true number of speakers is determined as an optimum model. In the above-described technique, expressing one speaker by a single Gaussian distribution of MFCCs is supposed to be problematic. However, it is not easy to devise an appropriate model alternative to the model.

For this reason, to apply the technique of non-patent literature 1 to an actual problem, the penalty coefficient $\lambda$ needs to be adjusted in advance using development data in the same domain as that of the problem. When the penalty coefficient is large, the estimated number of clusters decreases. When the penalty coefficient is small, the estimated number of clusters increases. However, since the appropriate value of λ generally changes depending on the problem, the development data needs to be prepared for each problem. In addition, when the problem changes, the correct number of clusters is difficult to estimate.

The technique of patent literature 1 assumes that the sorting accuracy of the image segments and sound segments of a target input video is known in advance. If the sorting accuracy of image segments and sound segments is unknown, it is impossible to accurately associate or sort the image segment and sound segments of a target input video. This is because when associating an image segment and a sound segment of an input video, the association method needs to be selected in accordance with the sorting accuracy of image segments and sound segments assumed in advance. However, what kind of association method is usable for an input video with specific contents to perform accurate association and sorting is unknown, and selection is difficult.

An exemplary object of the present invention is to provide a sound and image segment sorting technique capable of accurately sorting, for each object, a plurality of sound segments and a plurality of image segments contained in a video without adjusting parameters in advance.

Means of Solution to the Problem

A sound and image segment sorting device according to an exemplary aspect of the invention includes a sound segment sorting unit that sorts a plurality of sound segments contained in a video into at least one sound cluster based on an arbitrary operation condition so as to generate a sound segment sorting result, an image segment sorting unit that sorts a plurality of image segments contained in the video into at least one image cluster based on an arbitrary operation condition so as to generate an image segment sorting result, a multiple sorting result generation unit that generates a plurality of sound segment sorting results and/or a plurality of image segment sorting results by applying a plurality of different operation conditions to at least one of the sound segment sorting unit and the image segment sorting unit, a sorting result pair generation unit that generates a plurality of sorting result pairs each including one sound segment sorting result and one image segment sorting result based on the plurality of sound segment sorting results and the plurality of image segment sorting results obtained by the multiple sorting result generation unit, a sorting result comparative score calculation unit that calculates, for each sorting result pair, a sorting result comparative score representing a fitness between a sound segment sorting result and an image segment sorting result included in the sorting result pair, and a sorting result output unit that selects a sorting result pair having a high fitness based on the sorting result comparative score and outputs a sound segment sorting result and an image segment sorting result included in the sorting result pair.

A sound and image segment sorting method according to another exemplary aspect of the invention includes a sound segment sorting step of sorting a plurality of sound segments contained in a video into at least one sound cluster based on an arbitrary operation condition so as to generate a sound segment sorting result, an image segment sorting step of sorting a plurality of image segments contained in the video into at least one image cluster based on an arbitrary operation condition so as to generate an image segment sorting result, a multiple sorting result generation step of generating a plurality of sound segment sorting results and/or a plurality of image segment sorting results by applying a plurality of different operation conditions to at least one of the sound segment sorting step and the image segment sorting step when generating the sound segment sorting result and the image segment sorting result by applying the operation conditions to the sound segment sorting step and image segment sorting step, a sorting result pair generation step of generating a plurality of sorting result pairs each including one sound segment sorting result and one image segment sorting result based on the plurality of sound segment sorting results and the plurality of image segment sorting results obtained in the multiple sorting result generation step, a sorting result comparative score calculation step of calculating, for each sorting result pair, a sorting result comparative score representing a fitness between a sound segment sorting result and an image segment sorting result included in the sorting result pair, and a sorting result output step of selecting a sorting result pair having a high fitness based on the sorting result comparative score and outputting a sound segment sorting result and an image segment sorting result included in the sorting result pair.

Effect of the Invention

According to the present invention, it is possible to accurately sort, for each object, a plurality of sound segments and a plurality of image segments contained in a video without adjusting parameters in advance.

BRIEF DESCRIPTION OF DRAWINGS

FIG. 9A is a table showing examples of cluster comparative score calculation results concerning sorting result pairs;

FIG. 9B is a table showing examples of cluster comparative score calculation results concerning other sorting result pairs;

FIG. 9C is a table showing examples of cluster comparative score calculation results concerning other sorting result pairs;

FIG. 9D is a table showing examples of cluster comparative score calculation results concerning other sorting result pairs;

FIG. 9E is a table showing examples of cluster comparative score calculation results concerning other sorting result pairs;

FIG. 9F is a table showing examples of cluster comparative score calculation results concerning other sorting result pairs;

BEST MODE FOR CARRYING OUT THE INVENTION

The exemplary embodiments of the present invention will now be described with reference to the accompanying drawings.

First Exemplary Embodiment

The arrangement of a sound and image segment sorting device according to the first exemplary embodiment of the present invention will be described first with reference to FIG. 1.

Figure 1:
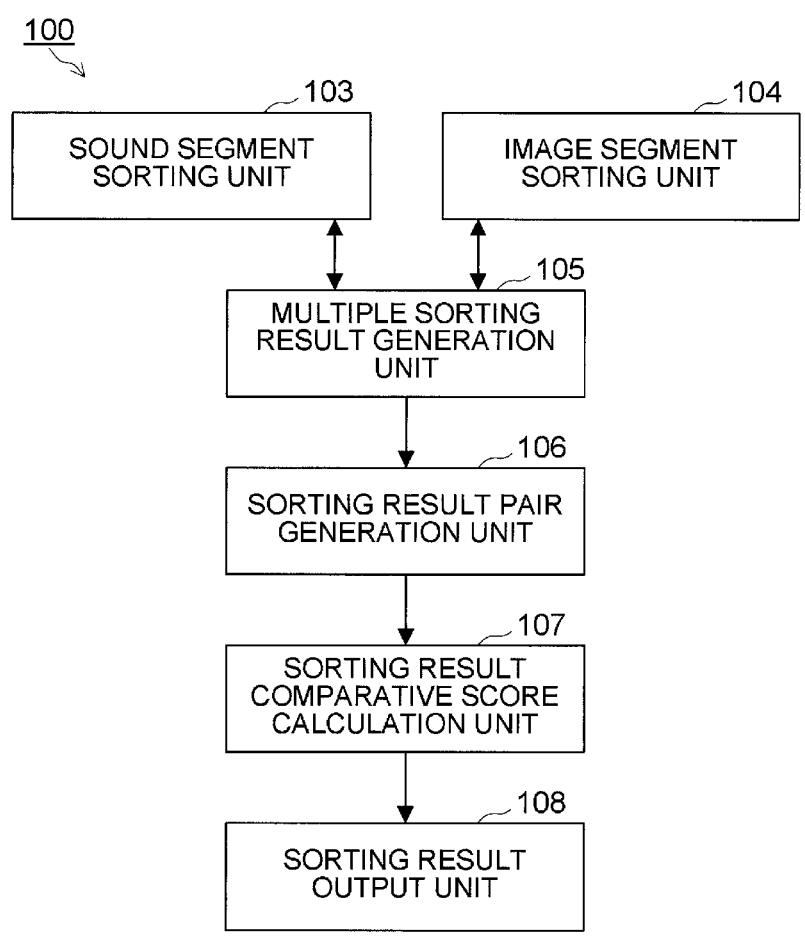
FIG. 1 is a block diagram showing the arrangement of a sound and image segment sorting device according to the first exemplary embodiment.

As shown in FIG. 1, a sound and image segment sorting device 100 according to this exemplary embodiment includes a sound segment sorting unit 103, an image segment sorting unit 104, a multiple sorting result generation unit 105, a sorting result pair generation unit 106, a sorting result comparative score calculation unit 107, and a sorting result output unit 108.

The sound segment sorting unit 103 receives a plurality of sound segments contained in a video and sorts these sound segments into one or a plurality of sound clusters based on arbitrary operation conditions.

The image segment sorting unit 104 receives a plurality of image segments contained in a video and sorts these image segments into one or a plurality of image clusters based on arbitrary operation conditions.

The multiple sorting result generation unit 105 operates the sound segment sorting unit 103 and the image segment sorting unit 104 while applying arbitrary operation conditions, and outputs the obtained sound segment sorting result and image sorting result to the sorting result pair generation unit 106. At this time, at least one of the sound segment sorting unit 103 and the image segment sorting unit 104 is operated while applying a plurality of different operation conditions so as to generate and output a plurality of sound segment sorting results or/and a plurality of image segment sorting results.

The sorting result pair generation unit 106 generates a plurality of sorting result pairs each including one sound segment sorting result and one image segment sorting result as the candidates of the optimum segment sorting result for the video based on the sound segment sorting results and image segment sorting results input from the multiple sorting result generation unit 105, and outputs the sorting result pairs to the sorting result comparative score calculation unit 107.

The sorting result comparative score calculation unit 107 calculates, for each sorting result pair input from the sorting result pair generation unit 106, a sorting result comparative score representing the goodness of correspondence, that is, the fitness between the sound segment sorting result and the image segment sorting result included in the sorting result pair, and outputs the sorting result comparative score to the sorting result output unit 108.

The sorting result output unit 108 compares the sorting result comparative scores of the respective sorting result pairs input from the sorting result comparative score calculation unit 107, selects a sorting result pair having a high sorting result comparative score, that is, a sorting result pair whose sound segment sorting result and image segment sorting result have a high fitness, and outputs the sound segment sorting result and image segment sorting result included in the selected sorting result pair.

Operation of First Exemplary Embodiment

The operation of the sound and image segment sorting device according to this exemplary embodiment will be explained next with reference to FIGS. 1 and 2.

Figure 2:
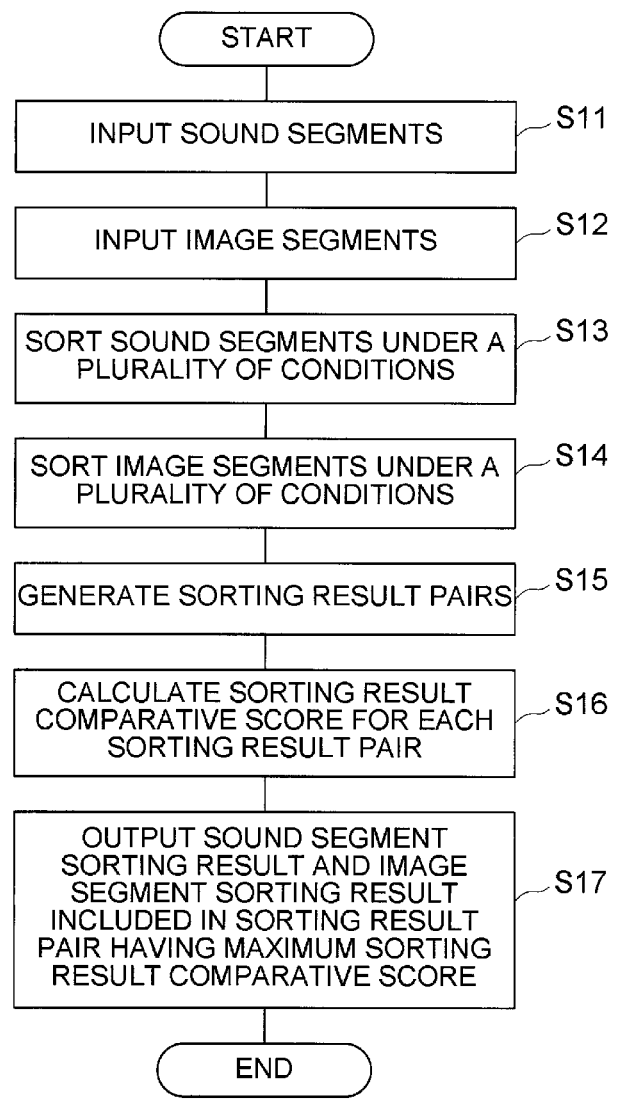
FIG. 2 is a flowchart illustrating the operation of the sound and image segment sorting device according to the first exemplary embodiment.

As shown in FIG. 2, first, a plurality of sound segments contained in a video are input to the sound segment sorting unit 103 (step S11). Next, a plurality of image segments contained in the video are input to the image segment sorting unit 104 (step S12).

The multiple sorting result generation unit 105 operates the sound segment sorting unit 103 to sort the input sound segments into one or a plurality of sound clusters. At this time, the multiple sorting result generation unit 105 operates the sound segment sorting unit 103 while applying a plurality of operation conditions so as to generate and output a plurality of sound segment sorting results (step S13).

The multiple sorting result generation unit 105 also operates the image segment sorting unit 104 to sort the input image segments into one or a plurality of image clusters. At this time, the multiple sorting result generation unit 105 operates the image segment sorting unit 104 while applying a plurality of operation conditions so as to generate and output a plurality of image segment sorting results (step S14).

In steps S13 and S14, the multiple sorting result generation unit 105 may operate only one of the sound segment sorting unit 103 and the image segment sorting unit 104 while applying a plurality of operation conditions so as to generate and output a plurality of sorting results concerning only the sound segments or image segments, and apply a single operation condition to the other unit so as to generate and output a single sorting result. Note that the operation conditions are preset based on the segment sorting algorithms used in the sound segment sorting unit 103 and the image segment sorting unit 104.

The sorting result pair generation unit 106 generates a plurality of sorting result pairs each including one of the sound segment sorting results and one of the image segment sorting results output from the multiple sorting result generation unit 105 (step S15).

The sorting result comparative score calculation unit 107 calculates, for each sorting result pair, a sorting result comparative score representing the fitness between the sound segment sorting result and the image segment sorting result included in the sorting result pair (step S16).

Finally, the sorting result output unit 108 compares the sorting result comparative scores, selects a sorting result pair having a high sorting result comparative score, and outputs the sound segment sorting result and image segment sorting result included in the selected sorting result pair (step S17). The sound segment sorting result and image segment sorting result are, for example, output to and stored in a storage unit (not shown), displayed on a screen display unit (not shown), or sent to an external device (not shown).

Effect of First Exemplary Embodiment

As described above, in the sound and image segment sorting device 100 according to this exemplary embodiment, the sound segment sorting unit 103 sorts the sound segments of a video, and the image segment sorting unit 104 sorts the image segments of the video. The multiple sorting result generation unit 105 generates a plurality of sound segment sorting results or/and a plurality of image segment sorting results. The sorting result pair generation unit 106 generates a plurality of sorting result pairs including the sorting results as the candidates of the optimum segment sorting result for the video. The sorting result output unit 108 compares the sorting result comparative scores of the sorting result pairs calculated by the sorting result comparative score calculation unit 107 and thus outputs a sound segment sorting result and image segment sorting result having good correspondence.

Hence, according to this exemplary embodiment, it is possible to obtain a sorting result in which a plurality of sound segments and a plurality of image segments contained in a video are accurately sorted for each object without adjusting parameters in advance.

Second Exemplary Embodiment

A sound and image segment sorting device according to the second exemplary embodiment of the present invention will be described next with reference to FIG. 3.

In the first exemplary embodiment, an example has been described in which a plurality of sound segments and a plurality of image segments detected from video data are sorted for each object and output. In the second exemplary embodiment, a case will be explained in which a sound and image segment sorting device 100 also outputs a result of associating sorted sound clusters and image clusters.

Figure 3:
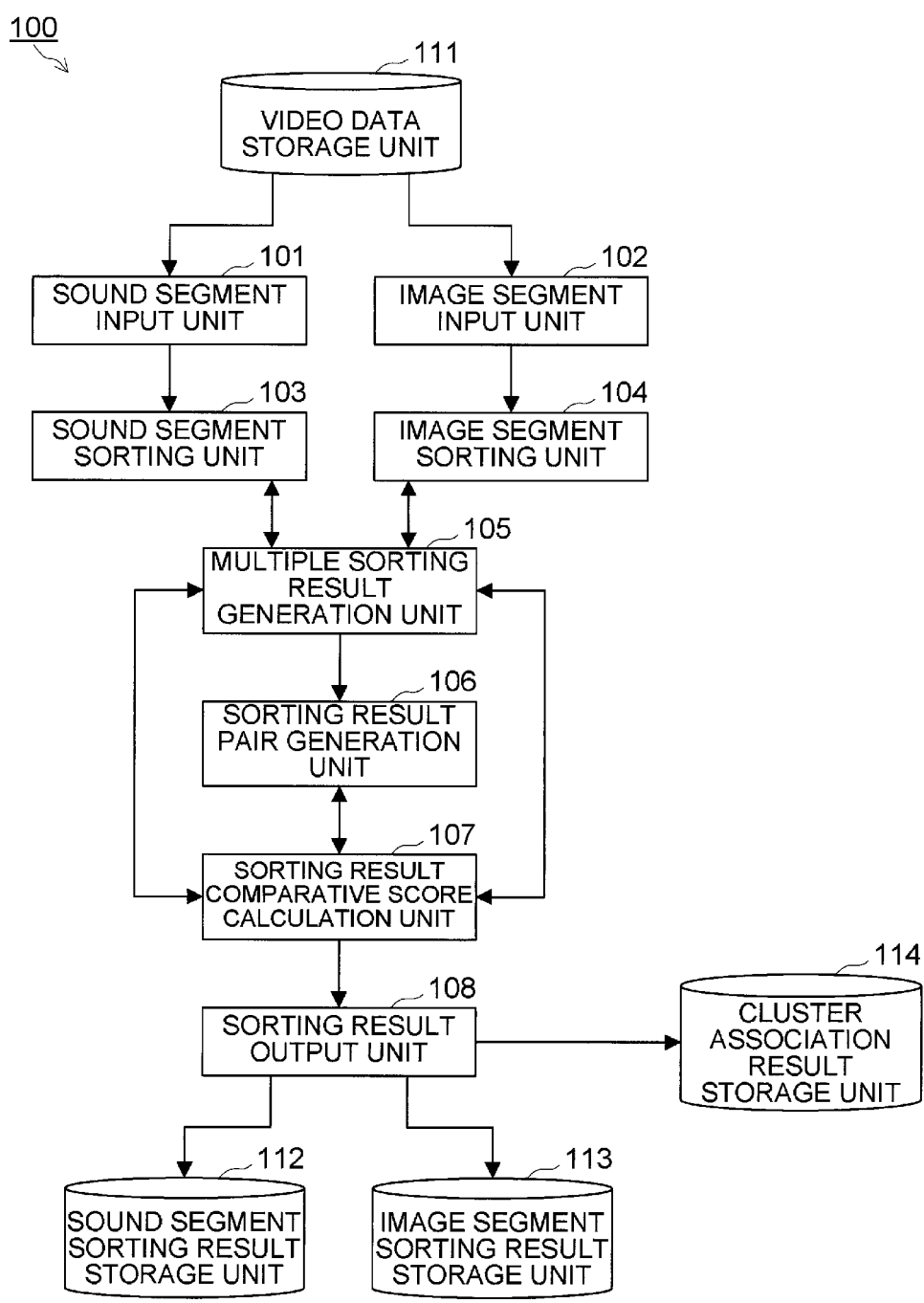
FIG. 3 is a block diagram showing the arrangement of a sound and image segment sorting device according to the second exemplary embodiment.

As shown in FIG. 3, the sound and image segment sorting device 100 according to this exemplary embodiment includes a sound segment sorting unit 103, an image segment sorting unit 104, a multiple sorting result generation unit 105, a sorting result pair generation unit 106, and a sorting result comparative score calculation unit 107, as described in the first exemplary embodiment. In the second exemplary embodiment, the sound and image segment sorting device 100 further includes a sound segment input unit 101, an image segment input unit 102, a video data storage unit 111, a sound segment sorting result storage unit 112, an image segment sorting result storage unit 113, and a cluster association result storage unit 114.

The video data storage unit 111 stores video data as a processing target. Various kinds of videos such as a conference video, a broadcast video, a lecture video, and a video distributed on the Internet are available as the video data. These video data can be either archive data prepared in advance or data input in real time from a video camera, a web camera, or the like.

The sound segment input unit 101 reads out sound data contained in the video data stored in the video data storage unit 111, and detects a plurality of sound segments from the sound data. In this exemplary embodiment, the sound segment input unit 101 detects, as a sound segment, a segment where a human voice exists.

A segment where a human voice exists can be detected from sound data using, for example, a power-based method of detecting a segment with high sound power or a model-based method of creating sound and non-sound models using an MFCC (Mel-Frequency Cepstrum Coefficient) or the like as a feature amount and detecting a segment where the likelihood of the sound model is larger than that of the non-sound model. Any other method is also usable as the human voice detection method.

Note that the sound segments may temporally overlap as in a case in which a plurality of speakers utter simultaneously. A sound segment need not always include a human voice. A segment of a sound concerning various objects such as a segment including an animal cry, a segment including a car engine sound, or a segment including a piece of BGM may be detected as a sound segment.

The image segment input unit 102 reads out image data contained in the video data stored in the video data storage unit 111, and detects a plurality of image segments from the image data. In this exemplary embodiment, the image segment input unit 102 detects, as an image segment, a segment where a human face exists.

A segment where a human face exists can be detected from image data using, for example, a method of creating a face model using color information, an edge direction, or the like as a feature amount and detecting a region similar to the model from each image frame of the image data. Any other method is also usable as the human face detection method.

Note that the image segments may temporally overlap as in a case in which a plurality of persons are simultaneously included in an image. An image segment need not always include a human face. A segment of an image concerning various objects such as a segment including an animal, a segment including a car, or a segment including one captured scene may be detected as an image segment.

Note that the types of objects represented by a sound segment and an image segment are preferably the same. That is, when a human voice is detected as a sound segment, a human face is preferably detected as an image segment. When an animal cry is detected as a sound segment, a segment including an animal is preferably detected as an image segment.

A segment of a sound and a segment of an image detected from video data while placing focus on a certain object will respectively be referred to as a "sound segment" and an "image segment" hereinafter. Note that each of the sound segment and the image segment is represented by data of a pair of start time and end time in the video data of the segment.

Operation of Second Exemplary Embodiment

Figure 4:
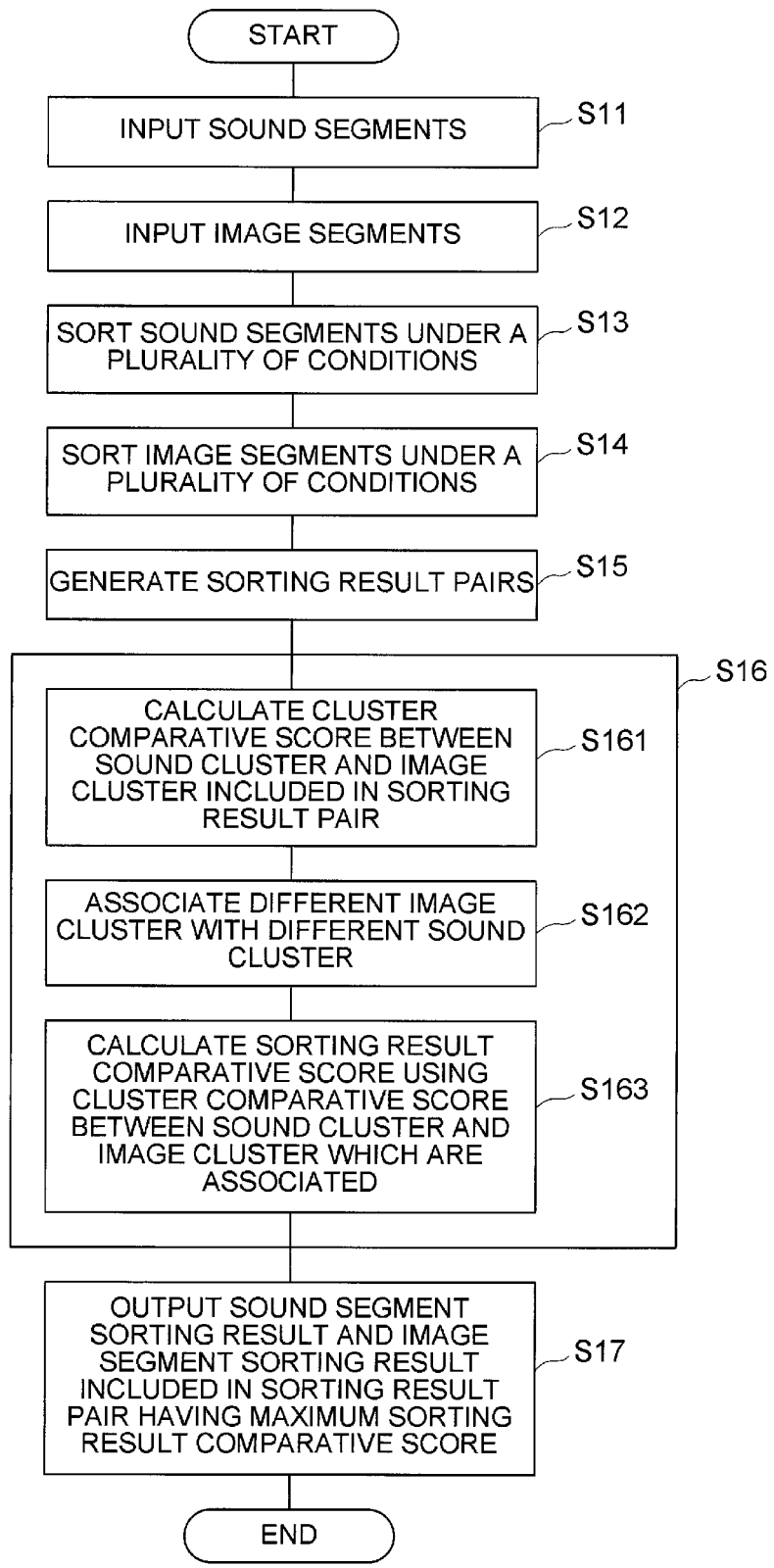
FIG. 4 is a flowchart illustrating the operation of the sound and image segment sorting device according to the second exemplary embodiment.

The operation of the sound and image segment sorting device according to this exemplary embodiment will be explained next with reference to FIGS. 3 and 4.

A plurality of sound segments detected by the sound segment input unit 101 are input to the sound segment sorting unit 103 (step S11). In addition, a plurality of image segments detected by the image segment input unit 102 are input to the image segment sorting unit 104 (step S12).

The sound segment sorting unit 103 has a function of sorting the plurality of input sound segments for each object. In this exemplary embodiment, a sound segment includes a human voice. Hence, the sound segment sorting unit 103 sorts the voices in the input sound segments for each person and puts a plurality of sound segments determined to include the same person's voice into a group. The group of the plurality of sound segments determined to be sound phenomena representing the same object will be referred to as a "sound cluster" hereinafter.

To sort a plurality of sound segments for each person, for example, the technique described in non-patent literature 1 is used. That is, first, all sound segments are defined as different clusters. Then, merging a pair of similar clusters is successively repeated, thereby clustering the sound segments. Whether to merge two clusters is determined by modeling the two clusters before and after merge and comparing BIC (Bayesian Information Criterion) of the two models. As the model, for example, a model assuming that the feature amounts of samples included in each cluster comply with a single Gaussian distribution is used. At this time, BIC for a given clustering result $(c_1, c_2, \ldots, c_K)$ is represented by equation (1) described above. When the BIC becomes small upon merging two clusters, the two clusters are merged. Cluster merging ends if the BIC does not become small anymore for every cluster pair to be merged.

The k-means method may be used as the method of sorting the plurality of sound segments for each person. The plurality of sound segments are sorted into K clusters using the k-means method in accordance with the following procedure. First, the average of the feature amounts such as the MFCCs of samples included in each sound segment is calculated as a feature amount representing the sound segment. Next, (1) K sound segments selected at random are defined as the representative points of K clusters. (2) All sound segments are assigned to the closest representative points. That is, each sound segment is assigned to a representative point having the most similar feature amount. (3) The center of gravity of the sound segments is calculated for each cluster as the new representative point of the cluster. (2) and (3) are repeated. If the sound segment assigned to each cluster does not change anymore, the clustering ends.

Note that any other method is also usable as the method of sorting the sound segments for each person. In addition, even when the sound segments are segments including an animal cry or a piece of BGM, the sound segments can be sorted for each animal or BGM type using a similar method.

The image segment sorting unit 104 has a function of sorting the plurality of input image segments for each object. In this exemplary embodiment, an image segment includes a human face. Hence, the image segment sorting unit 104 sorts the faces in the input image segments for each person and puts a plurality of image segments determined to include the same person's face into a group. The group of the plurality of image segments determined to be image phenomena representing the same object will be referred to as an "image cluster" hereinafter.

To sort a plurality of image segments for each person, a method based on an information criterion, the k-means method, or the like is used, as in sorting the sound segments. As the feature amount to be used for sorting, a feature vector that describes the shapes or position relationship of the eyes, nose, and mouth or a feature vector representing the two-dimensional array of the density values of pixels is used.

Note that any other method is also usable as the method of sorting the image segments for each person. In addition, even when the image segments are segments including an animal or one captured scene, the image segments can be sorted for each animal or captured scene type using a similar method.

The multiple sorting result generation unit 105 operates the sound segment sorting unit 103 under a plurality of operation conditions so as to generate a plurality of sound segment sorting results (step S13). In this exemplary embodiment, the sound segment sorting unit 103 is operated under a plurality of operation conditions to change the number of clusters to be obtained as a sorting result.

To change the number of clusters to be obtained as a sorting result when using the method described in non-patent literature 1 as the sorting method, the value of the penalty coefficient λ of equation (1) described above is changed. When λ is large, the penalty to an increase in the complexity of the model becomes large, and the number of clusters decreases. To the contrary, when λ is small, the number of clusters increases. When the k-means method is used as the sorting method, the value of the number K of clusters to be sorted is changed. When another sorting method is used, similarly, the sound segment sorting unit 103 is operated while changing the parameter to control the number of clusters, thereby obtaining a plurality of sorting results.

Figure 5:
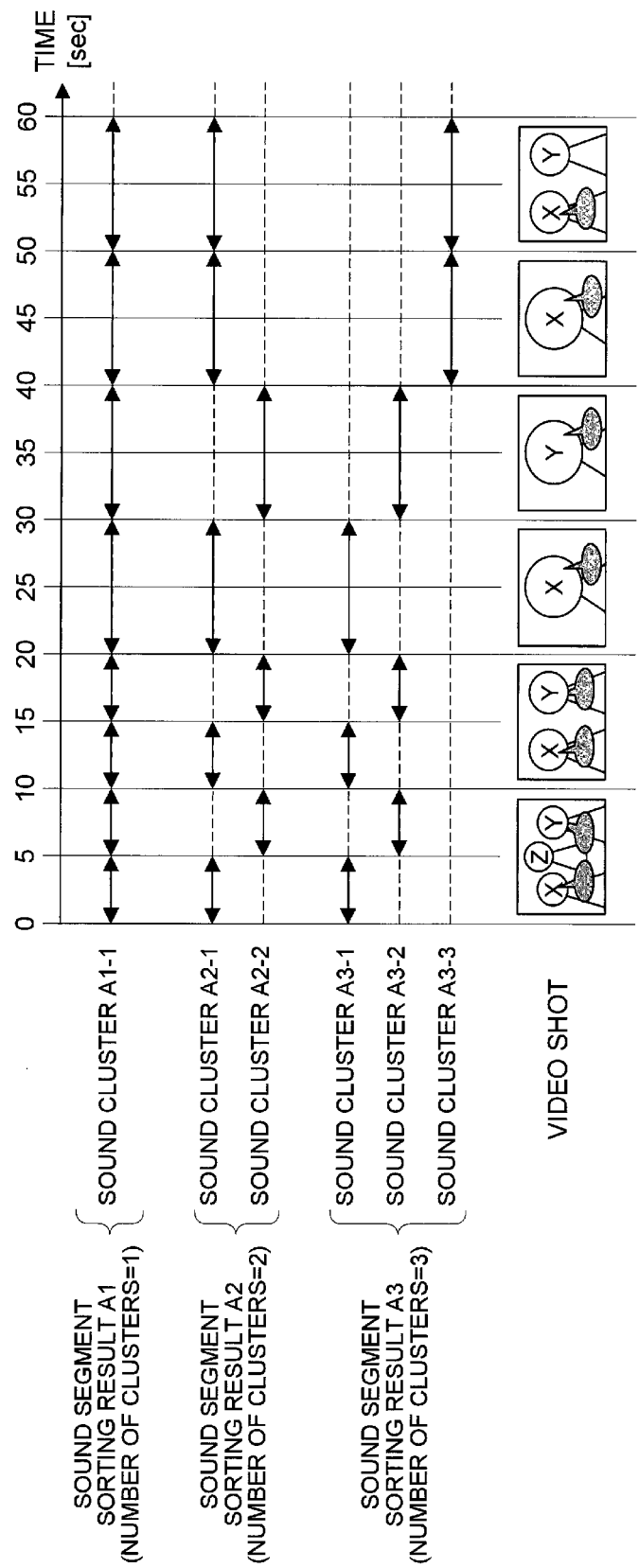
FIG. 5 is a view showing an example of sound segment sorting result generation.

FIG. 5 shows an analysis result of video data formed from video shots illustrated at the lower portion of FIG. 5. In this video, three persons X, Y, and Z appear on the scene, and the two persons X and Y are having a conversation. A balloon in FIG. 5 represents that the person is uttering.

FIG. 5 illustrates a case in which the sound segment sorting unit 103 is operated under three conditions to obtain a sound segment sorting result A1 in which the number of clusters is one, a sound segment sorting result A2 in which the number of clusters is two, and a sound segment sorting result A3 in which the number of clusters is three. The sorting result A1 is obtained by sorting all input sound segments to the voice of one person. As a result, a sound cluster A1-1 formed from all sound segments is generated. The sorting result A2 is obtained by sorting the input sound segments to the voices of two persons. As a result, a sound cluster A2-1 formed from the sound segments of 0 to 5 sec, 10 to 15 sec, 20 to 30 sec, 40 to 50 sec, and 50 to 60 sec in time and a sound cluster A2-2 formed from the sound segments of 5 to 10 sec, 15 to 20 sec, and 30 to 40 sec in time are obtained. The sorting result A3 is obtained by sorting the input sound segments to the voices of three persons, in which a sound cluster A3-1, a sound cluster A3-2, and a sound cluster A3-3 are generated.

The sound segments are correctly sorted for each person in the sorting result A2 out of the three sorting results A1 to A3. That is, the sound cluster A2-1 corresponds to the voice of the person X, and the sound cluster A2-2 corresponds to the voice of the person Y. In the sorting result A1, the voice of the person X and that of the person Y are sorted to the same sound cluster A1-1 (underdivision). On the other hand, in the sorting result A3, the voice of the person X is sorted to the two sound clusters A3-1 and A3-3 (overdivision).

Next, the multiple sorting result generation unit 105 operates the image segment sorting unit 104 under a plurality of operation conditions so as to generate a plurality of image segment sorting results (step S14). In this exemplary embodiment, the image segment sorting unit 104 is operated under a plurality of operation conditions to change the number of clusters to be obtained as a sorting result.

To change the number of clusters to be obtained as a sorting result, the parameter to control the number of clusters in the image segment sorting unit 104 is changed, as in sorting the sound segments.

Figure 6:
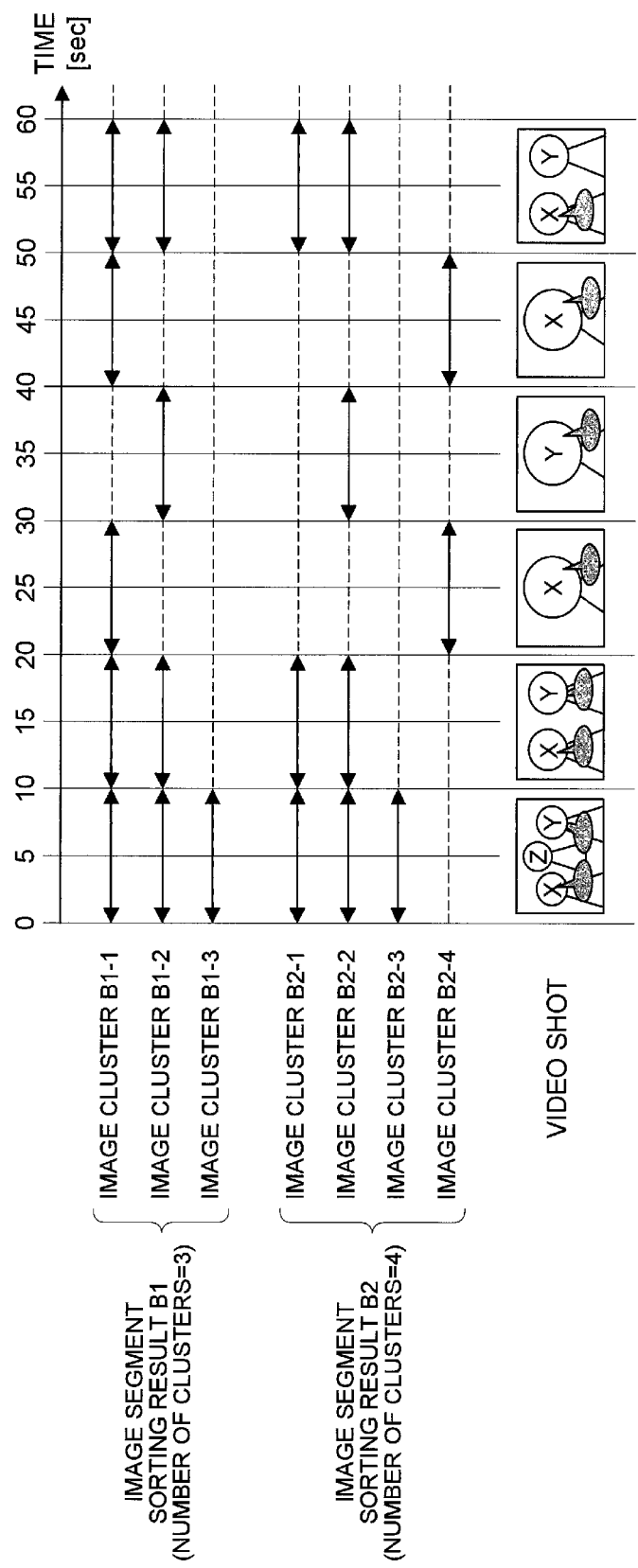
FIG. 6 is a view showing an example of image segment sorting result generation.

FIG. 6 shows an analysis result of the same video data as in FIG. 5 described above.

FIG. 6 illustrates a case in which the image segment sorting unit 104 is operated under two conditions to obtain an image segment sorting result B1 in which the number of clusters is three and an image segment sorting result B2 in which the number of clusters is four. The sorting result B1 is obtained by sorting the input image segments to the faces of three persons, in which an image cluster B1-1, an image cluster B1-2, and an image cluster B1-3 are generated. The sorting result B2 is obtained by sorting the input image segments to the faces of four persons, in which an image cluster B2-1, an image cluster B2-2, an image cluster B2-3, and an image cluster B2-4 are generated.

The image segments are correctly sorted for each person in the sorting result B1 out of the two sorting results B1 and B2. That is, the image cluster B1-1 corresponds to the face of the person X, the image cluster B1-2 corresponds to the face of the person Y, and the image cluster B1-3 corresponds to the face of the person Z. On the other hand, in the sorting result B2, the face of the person X is sorted to the two image clusters B2-1 and B2-4 (overdivision).

A set of sound clusters obtained by operating the sound segment sorting unit 103 under one operation condition will be referred to as a "sound segment sorting result" hereinafter. Similarly, a set of image clusters obtained by operating the image segment sorting unit 104 under one operation condition will be referred to as an "image segment sorting result". In some cases, the sets will be referred to as "sorting results" without distinction.

Next, the sorting result pair generation unit 106 generates a plurality of sorting result pairs each including one of the sound segment sorting results and one of the image segment sorting results generated by the multiple sorting result generation unit 105 (step S15).

In this exemplary embodiment, three sound segment sorting results (A1, A2, and A3) and two image segment sorting results (B1 and B2) are generated. Hence, in this exemplary embodiment, six sorting result pairs (A1-B1), (A1-B2), (A2-B1), (A2-B2), (A3-B1), and (A3-B2) are generated. In general, when there are M sound segment sorting results and N image segment sorting result, a maximum of M×N sorting result pairs can be generated.

The sorting result comparative score calculation unit 107 calculates, for each generated sorting result pair, a sorting result comparative score representing the goodness of correspondence between the sound segment sorting result and the image segment sorting result included in the sorting result pair (step S16). The operation of the sorting result comparative score calculation unit 107 will be described below by exemplifying calculating the sorting result comparative score for the sorting result pair (A2-B1).

Figures 7, 8:
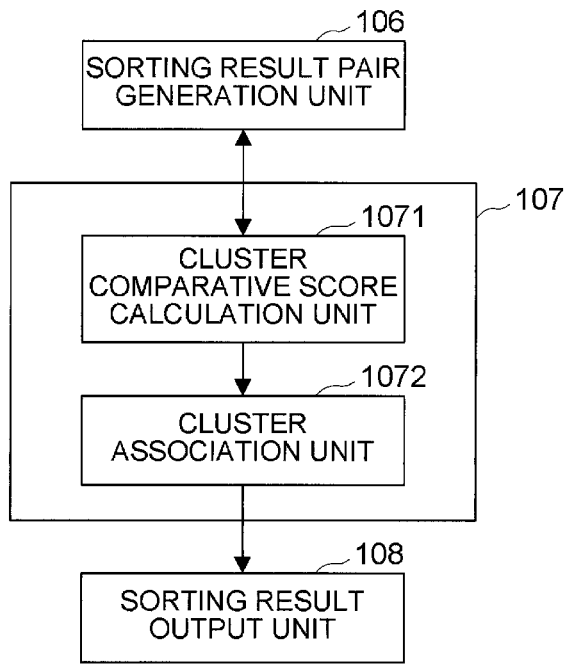
FIG. 7 is a block diagram showing an example of the arrangement of a sorting result comparative score calculation unit.
FIG. 8 is a table showing an example of weighting corresponding to each condition when calculating similarity.

Referring to FIG. 7, the sorting result comparative score calculation unit 107 includes a cluster comparative score calculation unit 1071 and a cluster association unit 1072.

First, the cluster comparative score calculation unit 1071 calculates, for each combination of a sound cluster and an image cluster included in a sorting result pair, a cluster comparative score representing the goodness of correspondence, that is, the fitness between the sound cluster and the image cluster (step S161). The sorting result pair (A2-B1) of this exemplary embodiment includes the sound clusters A2-1 and A2-2 and the image clusters B1-1, B1-2, and B1-3. Hence, the sound clusters and the image clusters can be combined in six different patterns (A2-1, B1-1), (A2-1, B1-2), (A2-1, B1-3), (A2-2, B1-1), (A2-2, B1-2), and (A2-2, B1-3).

The cluster comparative score calculation unit 1071 operates to determine the identity between the object represented by a sound cluster and the object represented by an image cluster, and if the two clusters represent the same object at a high possibility, give a high cluster comparative score to the two clusters. For example, since the object is a person in this exemplary embodiment, the cluster comparative score calculation unit 1071 operates to determine whether the voice included in a sound cluster and the face included in an image cluster belong to the same person, and give a higher cluster comparative score to the two clusters as the possibility that the voice and face belong to the same person becomes higher.

To determine whether a sound cluster and an image cluster represent the same object, for example, the similarity of the time-series pattern of appearance is calculated between the sound segment include in the sound cluster and the image segment included in the image cluster. The reason for this is as follows. A sound cluster and an image cluster which have similar time-series patterns of appearance represent the same object at a high possibility because a sound phenomenon and an image phenomenon concerning the same object supposedly appear at the same timing.

To calculate the similarity of the time-series pattern of appearance between a plurality of sound segments and a plurality of image segments, for example, the length of a segment where a sound segment and an image segment simultaneously exist can be regarded as the similarity. In addition, the length of a segment where a sound segment exists but no image segment exists may be subtracted from the similarity as a penalty. In this exemplary embodiment, it is equivalent to increasing the similarity when a voice and face simultaneously exist and decreasing the similarity when no face exists but only a voice exists. In video data of, for example, a talk or variety show, when the voice of a person exists, the face of the person is also shown simultaneously in many cases. Hence, calculating the similarity of the time-series pattern allows to determine whether the voice in a sound segment and the face in an image segment represent the same person.

Weighting each condition upon calculating the similarity is used here, as shown in FIG. 8. A value obtained by multiplying the length of a segment that satisfies each condition by a corresponding weight is regarded as the similarity of the time-series pattern and output as a cluster comparative score.

For example, the cluster comparative score between the sound cluster A2-1 and the image cluster B1-1 is calculated in the following way in accordance with the weights shown in FIG. 8. The sound segments and the image segments simultaneously exist during a total of 40 sec corresponding to the segments of 0 to 5 sec, 10 to 15 sec, 20 to 30 sec, and 40 to 60 sec in time. Hence, the length is multiplied by the weight "1" in FIG. 8 to obtain a score "40". Not the sound segments but the image segments exist during a total of 10 sec corresponding to the segments of 5 to 10 sec and 15 to 20 sec in time. Hence, the length is multiplied by the weight "0" in FIG. 8 to obtain a score "0". Neither sound segments nor image segments exist during a total of 10 sec corresponding to the segment of 30 to 40 sec in time. Hence, the length is multiplied by the weight "0" in FIG. 8 to obtain a score "0". These scores are added to obtain the cluster comparative score between the sound cluster A2-1 and the image cluster B1-1 as 40+0+0=40.

In a similar manner, the cluster comparative score between the sound cluster A2-2 and the image cluster B1-1 is calculated. The sound segments and the image segments simultaneously exist during a total of 10 sec corresponding to the segments of 5 to 10 sec and 15 to 20 sec in time. Hence, the length is multiplied by the weight "1" to obtain a score "10". Not the sound segments but the image segments exist during a total of 40 sec corresponding to the segments of 0 to 5 sec, 10 to 15 sec, 20 to 30 sec, and 40 to 60 sec in time. Hence, the length is multiplied by the weight "0" to obtain a score "0". On the other hand, not the image segments but the sound segments exist during a total of 10 sec corresponding to the segment of 30 to 40 sec in time. Hence, the length is multiplied by the weight "−1" in FIG. 8 to obtain a score "−10". The cluster comparative score between the sound cluster A2-2 and the image cluster B1-1 can thus be obtained as 10+0−10=0.

FIG. 9B shows the cluster comparative scores for the sorting result pair (A2-B1). As is apparent from FIGS. 9A to 9F, when the cluster comparative scores are calculated in this way, a higher cluster comparative score can be given as the similarity of time-series pattern between the sound segment included in a sound cluster and the image segment included in an image cluster becomes higher.

Note that in FIG. 8, if not a sound segment but an image segment exists, the weight is set to 0 without giving a penalty. This is because in this exemplary embodiment, a sound segment is a segment including a human voice, and an image segment is a segment including a human face. That is, the weight is set to 0 because there are many scenes in which the face of a person is shown, though he/she is not uttering. In addition, assuming that there is a person (corresponding to the person Z) who does not appear in most of the time of the video, no weight is given, that is, the weight is set to 0 for a segment where neither a sound segment nor an image segment exists as well.

However, the manner the weight is given is not limited to that in FIG. 8. For example, assume that for an object, when the object is shown as an image, a sound concerning the object almost surely exists. In this case, the weight may be set to −1 so as to give a penalty to the segment where not the sound segment but only the image segment exists. In addition, the value of the weight may appropriately be changed.

The method of calculating the similarity of the time-series pattern between a sound segment and an image segment is not limited to the above-described method. For example, video data may be segmented for each video shot or a predetermined time, and the number of segments where a sound segment and an image segment simultaneously appear may be counted. In addition, any other method of calculating the similarity of the time-series pattern is also usable.

In addition, the method of determining whether a sound cluster and an image cluster represent the same object is not limited to the method of obtaining the similarity of the time-series pattern between the sound segment and the image segment. An appropriate method for determining the identity between objects is usable in accordance with the contents of video data or the object to sort.

As described above, the cluster comparative score calculation unit 1071 calculates, for each combination of a sound cluster and an image cluster included in a sorting result pair, a cluster comparative score representing the goodness of correspondence between the sound cluster and the image cluster.

Next, the cluster association unit 1072 associates sound clusters and image clusters included in a sorting result pair such that a different cluster is associated with a different cluster (step S162), and calculates the sorting result comparative score of the sorting result pair using the cluster comparative scores between the sound clusters and the image clusters which are associated (step S163). In other words, the sound clusters and the image clusters included in a sorting result pair are associated in a one-to-one correspondence. At this time, it is preferable to associate clusters that represent the same object at a high possibility.

To do this association, for example, a sound cluster and an image cluster are associated in descending order of the cluster comparative score, that is, the fitness of the combination of the sound cluster and the image cluster.

Referring to, for example, FIG. 9B, out of the combinations of the sound clusters and the image clusters included in the sorting result pair (A2-B1), the combination (A2-1, B1-1) has the highest cluster comparative score of 40. First, assuming that the possibility that the sound cluster A2-1 and the image cluster B1-1 represent the same object is highest, and these clusters are associated.

When the sound cluster A2-1 and the image cluster B1-1 which are already associated are excluded, the combination (A2-2, B1-2) has the second highest cluster comparative score of 20. Hence, the sound cluster A2-2 and the image cluster B1-2 are associated. Since all sound clusters have been associated at this point of time, the association processing ends. At this time, the image cluster B1-3 is not associated with any sound cluster. This is because the person represented by the image cluster B1-3 is not uttering in the video. In FIGS. 9A to 9F, the cluster comparative scores corresponding to the combinations of the thus associated sound clusters and image clusters are circled.

Thus associating the sound clusters and the image clusters makes it possible to associate a sound cluster and an image cluster which represent the same object at a high possibility by calculation in a small amount and calculate an appropriate sorting result comparative score. Note that the sound clusters and the image clusters are associated in a one-to-one correspondence because it is assumed that a sound cluster represents an object different from that of another sound cluster, and an image cluster represents an object different from that of another image cluster.

With the above-described processing, in the sorting result pair (A2-B1), the clusters are associated in (A2-1, B1-1) and (A2-2, B1-2). The cluster comparative scores of the two combinations are added to obtain the sorting result comparative score as 40+20=60. This score represents how good the sound segment sorting result A2 and the image segment sorting result B1 are associated. In other words, this score represents how likely each of the sound segment sorting result A2 and the image segment sorting result B1 is when they are simultaneously selected as the sorting result. Additionally, in the sorting result pair (A2-B1), the possibility that the sound cluster A2-1 and the image cluster B1-1 represent the same person, and the sound cluster A2-2 and the image cluster B1-2 also represent the same person is highest, as can be seen.

Note that as the method of associating a sound cluster and an image cluster included in a sorting result pair, temporary sorting result comparative scores may be calculated for all possible association patterns between the sound clusters and the image clusters, and an association pattern that maximizes the sorting result comparative score may be employed. In, for example, the sorting result pair (A2-B1), there are six possible association patterns "(A2-1, B1-1) and (A2-2, B1-2)", "(A2-1, B1-1) and (A2-2, B1-3)", "(A2-1, B1-2) and (A2-2, B1-1)", "(A2-1, B1-2) and (A2-2, B1-3)", "(A2-1, B1-3) and (A2-2, B1-1)", and "(A2-1, B1-3) and (A2-2, B1-2)". Temporary sorting result comparative scores for these association patterns are calculated as 60, 30, 0, −10, −30, and −10. Hence, the association pattern "(A2-1, B1-1) and (A2-2, B1-2)" that has the highest score of 60 is employed, and the sorting result comparative score is obtained as 60.

Thus associating the sound clusters and the image clusters makes it possible to verify all possible cluster association patterns in a sorting result pair without leaving out any single pattern and thus calculate an optimum sorting result comparative score.

By the above-described method, the sorting result comparative score calculation unit 107 can calculate the sorting result comparative score representing the goodness of correspondence between the sorting results for each sorting result pair generated by the sorting result pair generation unit. Referring to FIGS. 9A to 9F, the sorting result comparative score of the sorting result pair (A1-B1) is 40, the sorting result comparative score of the sorting result pair (A2-B1) is 40+20=60, the sorting result comparative score of the sorting result pair (A3-B1) is 20+20−10=30, the sorting result comparative score of the sorting result pair (A1-B2) is 20, the sorting result comparative score of the sorting result pair (A2-B2) is 0+20=20, and the sorting result comparative score of the sorting result pair (A3-B2) is 0+20+0=20.

Finally, the sorting result output unit 108 compares the sorting result comparative scores calculated by the sorting result comparative score calculation unit 107, selects a sorting result pair having a high sorting result comparative score, and outputs the sound segment sorting result and image segment sorting result included in the selected sorting result pair (step S17). The sound segment sorting result and image segment sorting result are, for example, output to and stored in a storage unit (not shown), displayed on a screen display unit (not shown), or sent to an external device (not shown).

In this exemplary embodiment, the sorting result pair (A2-B1) having the highest sorting result comparative score of 60 is selected. The sound segment sorting result A2 included in the sorting result pair is output to the sound segment sorting result storage unit 112, and the image segment sorting result B1 is output to the image segment sorting result storage unit 113. That is, finally, the sound clusters A2-1 and A2-2 are obtained as the sound segment sorting result, and the image clusters B1-1, B1-2, and B1-3 are obtained as the image segment sorting result. These sorting results are correctly associated with the three persons X, Y, and Z that appear in the video data of this exemplary embodiment without causing underdivision or overdivision.

In this exemplary embodiment, the sorting result in which the number of clusters equals the true number of speakers can correctly be obtained because when the sorting result in which the number of clusters equals the true number of speakers is selected, the cluster comparative score between the sound cluster and the image cluster is maximized, and the sorting result comparative score consequently becomes high.

In this exemplary embodiment, in, for example, the sound segment sorting result A3, the voice corresponding to the person X is overdivided into the two sound clusters A3-1 and A3-3. In this case, both sound clusters have a low cluster comparative score with respect to the image cluster B1-1. The cluster association unit 1072 permits only a one-to-one correspondence as the association pattern between a sound cluster and an image cluster. For this reason, a sorting result that overdivides a single person has a low score and is therefore not selected.

In the sound segment sorting result A1 of this exemplary embodiment, the voices corresponding to the persons X and Y are mixed into one sound cluster A1-1. Hence, the sound cluster A1-1 has a low cluster comparative score with respect to each of the image cluster B1-1 corresponding to the person X and the image cluster B1-2 corresponding to the person Y. For this reason, such a sorting result is not selected either.

Sound segment sorting and image segment sorting are done using feature amounts having different characteristics. Hence, the tendency of overdivision and underdivision is generally supposed to change between the sound segment and the image segment. For example, in this exemplary embodiment, the sound clusters A3-1 and A3-3 of the sound segment sorting result A3 are obtained as the result of overdivision of the voice of the person X. On the other hand, the image clusters B2-1 and B2-4 of the image segment sorting result B2 are obtained as the result of overdivision of the face of the person X. However, it is hard to assume that the voice and face are overdivided in the same way. In most cases, different overdivision results are obtained, as shown in FIGS. 5 and 6. Hence, a satisfactory cluster comparative score can rarely be obtained by combining the overdivided sound cluster and image cluster, and such a combination is never selected.

For these reasons, it is possible to accurately sort, for each object, a plurality of sound segments and a plurality of image segments contained in video data without adjusting the parameters in advance. In this exemplary embodiment, the segments of human voices and the segments of human faces contained in the video data can be sorted for each person.

Note that the sorting result output unit 108 may output, to the cluster association result storage unit 114, the association pattern between the sound cluster and the image cluster when the sorting result comparative score calculation unit 107 has calculated the sorting result score for the finally selected sorting result pair. In this exemplary embodiment, the sorting result score for the selected sorting result pair (A2-B1) is obtained when the sound cluster and the image clusters are associated as "(A2-1, B1-1) and (A2-2, B1-2)". For this reason, a result representing that the sound cluster A2-1 and the image cluster B1-1 represent the voice and face of the same person and the sound cluster A2-2 and the image cluster B1-2 represent the voice and face of another same person is output.

Effect of Second Exemplary Embodiment

As described above, in the sound and image segment sorting device 100 according to this exemplary embodiment, a plurality of candidates of sorting results of voices and a plurality of candidates of sorting results of faces contained in video data are generated. A voice sorting result and a face sorting result, which have the best correspondence between the voice sorting result and the face sorting result, are output.

Hence, according to this exemplary embodiment, it is possible to obtain a sorting result that accurately sorts, for each person, a plurality of voice segments and a plurality of face segments contained in video data without adjusting parameters in advance.

Note that in this exemplary embodiment, the multiple sorting result generation unit 105 operates both the sound segment sorting unit 103 and the image segment sorting unit 104 under a plurality of operation conditions, thereby generating a plurality of sound segment sorting results and a plurality of image segment sorting results. However, the multiple sorting result generation unit 105 may operate only one of the sound segment sorting unit 103 and the image segment sorting unit 104 under a plurality of operation conditions.

For example, a plurality of sound segment sorting results may be generated, and only one image segment sorting result may be generated. This is effective when the accuracy of the image segment sorting unit 104 is high. For example, when the face data of persons who appear in video data are collectable in advance, the model of the face is created in advance for each person, and the image segment sorting unit 104 is implemented by accurate face collation. In this case, one accurate result is output as an image segment sorting result, and a plurality of sound segment sorting results are output. Then, the same processing as that from the sorting result pair generation unit 106 is executed. This enables to obtain an accurate sound segment sorting result because only the sound segment sorting result needs to be selected. To the contrary, one accurate sound segment sorting result may be output, and a plurality of image segment sorting results may be output.

Additionally, in this exemplary embodiment, the sorting result pair generation unit 106 generates all possible pairs between the plurality of sound segment sorting results (A1, A2, and A3) and the plurality of image segment sorting results (B1 and B2). Instead, the sorting result pair generation unit 106 may first generate several sorting result pairs using sorting results of largely different operation conditions. Next, the sorting result comparative score calculation unit 107 may calculate the sorting result comparative score of each of the sorting result pairs. Again, the sorting result pair generation unit 106 may preferentially generate a sorting result pair including a sound segment sorting result and an image segment sorting result generated under an operation condition close to that used to generate a sound segment sorting result and an image segment sorting result included in a sorting result pair having a high sorting result comparative score. This processing may repetitively be performed.

Figure 10:
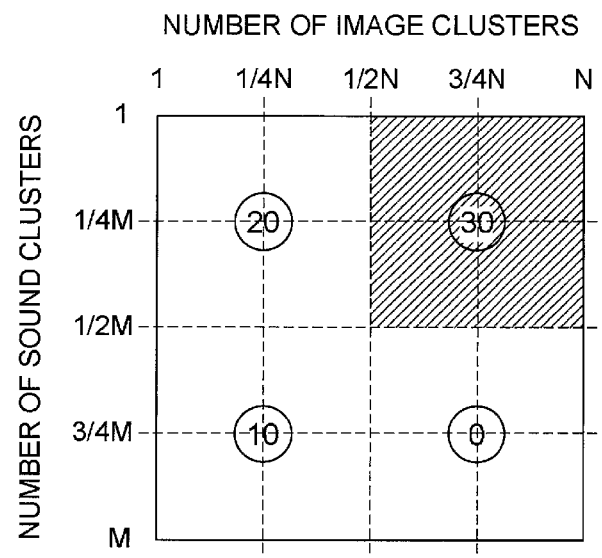
FIG. 10 is an explanatory view showing a detailed example of the operation of a sorting result pair generation unit.
Figure 11:
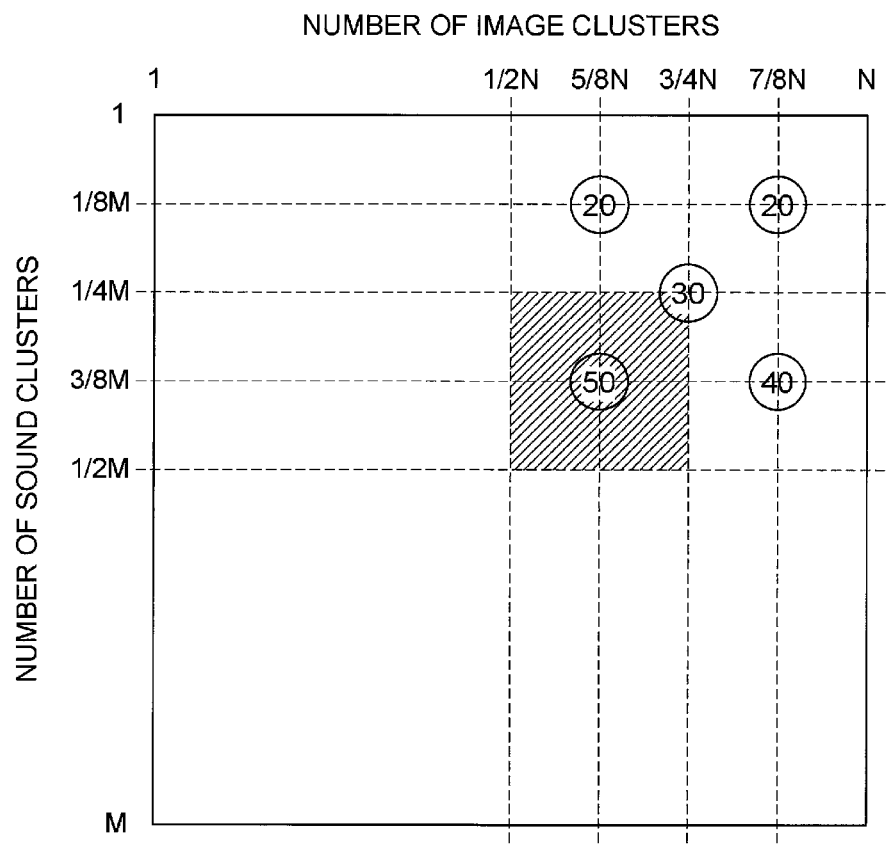
FIG. 11 is an explanatory view showing another detailed example of the operation of the sorting result pair generation unit.

This processing will be explained with reference to FIGS. 10 and 11.

In this case, the operation conditions of the sound segment sorting unit 103 and the image segment sorting unit 104 are changed to change the number of clusters. Sorting results in which the number of sound clusters ranges from 1 to M are obtained as sound segment sorting results, and sorting results in which the number of image clusters ranges from 1 to N are obtained as image segment sorting results.

At this time, the sorting result pair generation unit 106 first generates sorting result pairs by combining the sorting results in which the numbers of sound clusters are M×¼ and M×¾ and the sorting results in which the numbers of image clusters are N×¼ and N×¾, which are the sorting results of largely different operation conditions. Assume that the sorting result comparative scores for these sorting result pairs are calculated, and the sorting result pair including the sorting result in which the number of sound clusters is M×¼ and the sorting result in which the number of image clusters is N×¾ has the maximum score of 30, as shown in FIG. 10. At this time, the sorting result pair generation unit 106 generates sorting result pairs of operation conditions closer to those of the sorting result pair and calculates the sorting result comparative scores again, as shown in FIG. 11. That is, the sorting results in which the numbers of clusters are close are combined with each other.

Repeating this processing enables to finally select an appropriate sorting result pair without calculating the sorting result comparative scores of all sorting result pairs. It is therefore possible to largely reduce the calculation amount. Note that the multiple sorting result generation unit 105 may similarly generate only sorting results of largely different operation conditions and repetitively generate sorting results, instead of generating all sorting results from the beginning. This allows to further decrease the calculation amount.

In this exemplary embodiment, the multiple sorting result generation unit 105 operates the sound segment sorting unit 103 and the image segment sorting unit 104 under a plurality of operation conditions to change the number of clusters to be obtained as a sorting result. However, the multiple sorting result generation unit 105 may operate the sound segment sorting unit 103 or the image segment sorting unit 104 using a plurality of different clustering methods. As the plurality of clustering methods, for example, the method described in non-patent literature 1, the k-means method, and the like are usable. This enables to select an optimum one of sorting results obtained by the plurality of clustering methods.

Third Exemplary Embodiment

A sound and image segment sorting device according to the third exemplary embodiment of the present invention will be described next with reference to FIG. 12.

The third exemplary embodiment is implemented as a computer that operates based on a program that constitutes the first exemplary embodiment.

Figure 12:
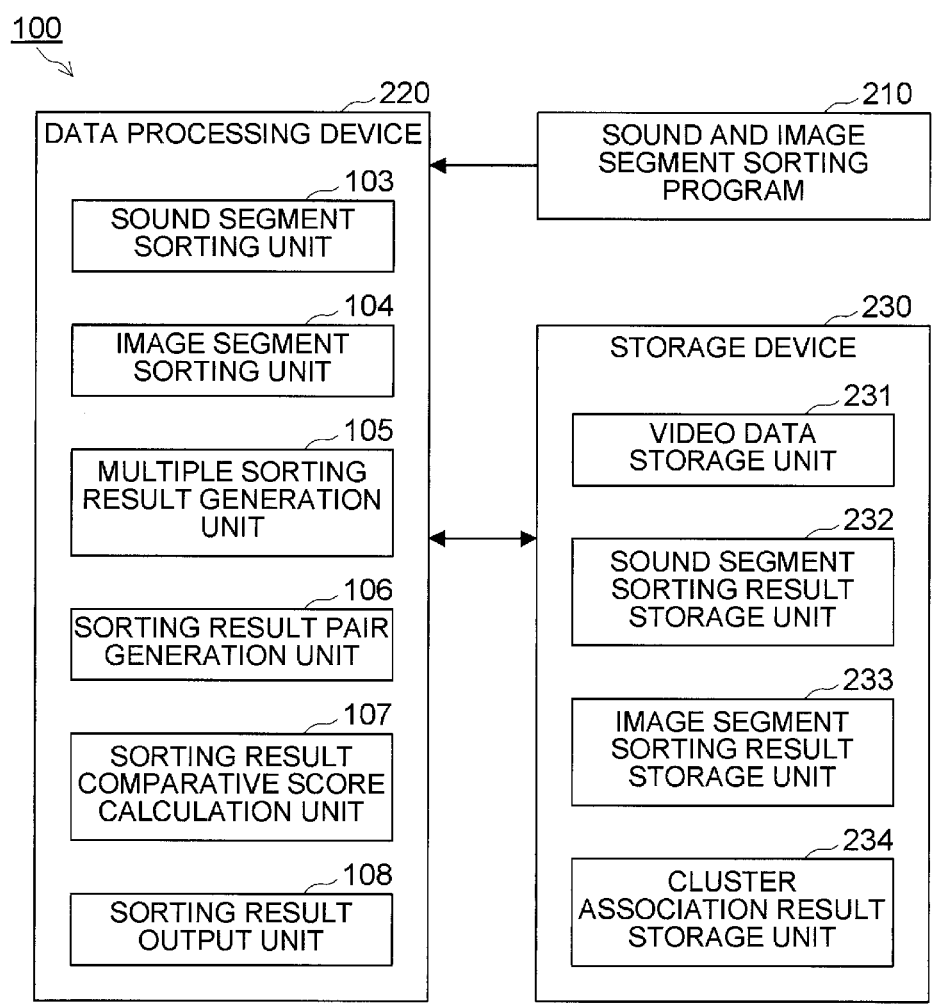
FIG. 12 is a block diagram showing the arrangement of a sound and image segment sorting device according to the third exemplary embodiment.

Referring to FIG. 12, a sound and image segment sorting device 100 according to this exemplary embodiment includes a data processing device 220 including a CPU and the like, a storage device 230 formed from a magnetic disk, a semiconductor memory, or the like, and a sound and image segment sorting program 210.

The storage device 230 serves as a video data storage unit 231, a sound segment sorting result storage unit 232, an image segment sorting result storage unit 233, and a cluster association result storage unit 234.

The sound and image segment sorting program 210 is loaded to the data processing device 220 and controls the operation of the data processing device 220, thereby implementing the function of the sound and image segment sorting device 100 according to the first exemplary embodiment on the data processing device 220. That is, the data processing device 220 executes the processes of a sound segment sorting unit 103, an image segment sorting unit 104, a multiple sorting result generation unit 105, a sorting result pair generation unit 106, a sorting result comparative score calculation unit 107, and a sorting result output unit 108 described above under the control of the sound and image segment sorting program 210.

This application is based upon and claims the benefit of priority from Japanese patent application No. 2009-264107, filed on Nov. 19, 2009, the disclosure of which is incorporated herein in its entirety by reference.

Expansion of Exemplary Embodiment

While the invention has been particularly shown and described with reference to exemplary embodiments thereof, the invention is not limited to these exemplary embodiments. It will be understood by a person of ordinary skill in the art that various changes in form and details may be made therein without departing from the spirit and scope of the present invention as defined by the claims.

INDUSTRIAL APPLICABILITY

The present invention is applicable to a video search/browsing system capable of easily grasping, searching for, and browsing an object contained in a video by sorting, for each object, sound segments and image segments in various videos such as a conference video, a broadcast video, and a lecture video, and a program for implementing the video search/browsing system on a computer. The present invention is also applicable to a personal search/browsing system capable of creating a list of persons who appear in these videos and searching for and browsing a scene where a person appears.

EXPLANATION OF THE REFERENCE NUMERALS AND SIGNS

100 . . . sound and image segment sorting device, 101 . . . sound segment input unit, 102 . . . image segment input unit, 103 . . . sound segment sorting unit, 104 . . . image segment sorting unit, 105 . . . multiple sorting result generation unit, 106 . . . sorting result pair generation unit, 107 . . . sorting result comparative score calculation unit, 1071 . . . cluster comparative score calculation unit, 1072 . . . cluster association unit, 108 . . . sorting result output unit, 111 . . . video data storage unit, 112 . . . sound segment sorting result storage unit, 113 . . . image segment sorting result storage unit, 114 . . . cluster association result storage unit, 210 . . . sound and image segment sorting program, 220 . . . data processing device, 230 . . . storage device, 231 . . . video data storage unit, 232 . . . sound segment sorting result storage unit, 233 . . . image segment sorting result storage unit, 234 . . . cluster association result storage unit

The invention claimed is:

1. A sound and image segment sorting device comprising:
a sound segment sorting unit that sorts a plurality of sound segments contained in a video based on an arbitrary operation condition and generates sound segment sorting results, each of said sound segments sorting results being a collection of sound clusters including at least one sound cluster as an element, and each of said at least one sound cluster being a collection of sound segments determined to be sound phenomena representing a same object;

an image segment sorting unit that sorts a plurality of image segments contained in the video based on an arbitrary operation condition and generates image segment sorting results, each of said image segment sorting results being a collection of image clusters including at least one image cluster as an element, and each of said at least one image cluster being a collection of image segments determined to be image phenomena representing a same object;

a multiple sorting result generation unit that generates at least one of a plurality of sound segment sorting results and a plurality of image segment sorting results by applying a plurality of different operation conditions to at least one of said sound segment sorting unit and said image segment sorting unit;

a sorting result pair generation unit that generates a plurality of sorting result pairs each including one sound segment sorting result and one image segment sorting result based on the plurality of sound segment sorting results and the plurality of image segment sorting results obtained by said multiple sorting result generation unit;

a sorting result comparative score calculation unit that calculates, for each sorting result pair, a sorting result comparative score representing a fitness between a sound segment sorting result and an image segment sorting result included in the sorting result pair; and a sorting result output unit that selects a sorting result pair having a high fitness among said plurality of sorting result pairs based on the sorting result comparative score and outputs a sound segment sorting result and an image segment sorting result included in the sorting result pair.

2. A sound and image segment sorting device according to claim 1, wherein said sorting result comparative score calculation unit comprises:

a cluster comparative score calculation unit, that calculates, for each combination of a sound cluster and an image cluster included in the sound segment sorting result and the image segment sorting result of the sorting result pair, a cluster comparative score representing a fitness between the sound cluster and the image cluster; and a cluster association unit that associates the sound clusters and the image clusters included in the sound segment sorting result and the image segment sorting result of the sorting result pair in a one-to-one correspondence and calculates the sorting result comparative score using the cluster comparative scores between the sound clusters and the image clusters which are associated.

3. A sound and image segment sorting device according to claim 2, wherein said cluster comparative score calculation unit calculates the cluster comparative score based on an identity between an object represented by the sound cluster and an object represented by the image cluster.

4. A sound and image segment sorting device according to claim 3, wherein said cluster comparative score calculation unit calculates a similarity of a time-series pattern between a sound segment included in the sound cluster and an image segment included in the image cluster and obtains the similarity as the cluster comparative score.

5. A sound and image segment sorting device according to claim 4, wherein said cluster comparative score calculation unit calculates the similarity of the time-series pattern by adding weights according to presence/absence of the sound segment and presence/absence of the image segment.

6. A sound and image segment sorting device according to claim 5, wherein said cluster comparative score calculation unit gives a score of a high similarity to a segment where the sound segment and the image segment simultaneously exist and a score of a low similarity to a segment where the sound segment exist when the image segment does not exist.

7. A sound and image segment sorting device according to claim 2, wherein said cluster association unit calculates temporary sorting result comparative scores for all possible association patterns between the sound clusters and the image clusters using the cluster comparative scores and outputs a maximum value of the temporary sorting result comparative scores as the sorting result comparative score.

8. A sound and image segment sorting device according to claim 2, wherein said cluster association unit associates the sound clusters and the image clusters based on a combination selected by the cluster comparative score from the combinations of the sound clusters and the image clusters in descending order of the fitness.

9. A sound and image segment sorting device according to claim 2, wherein said cluster association unit outputs, as the sorting result comparative score, a sum of the cluster comparative scores between the sound clusters and the image clusters which are associated.

10. A sound and image segment sorting device according to claim 1, wherein said sorting result pair generation unit generates all possible sorting result pairs between the plurality of sound segment sorting results and the plurality of image segment sorting results.

11. A sound and image segment sorting device according to claim 1, wherein said sorting result pair generation unit selects, out of the plurality of sorting result pairs generated from the plurality of sound segment sorting results and the plurality of image segment sorting results, a sorting result pair having a maximum sorting result comparative score obtained by said sorting result comparative score calculation unit, and preferentially generates a sorting result pair including a sound segment sorting result and an image segment sorting result generated under an operation condition close to an operation condition used to generate a sound segment sorting result and an image segment sorting result included in the sorting result pair.

12. A sound and image segment sorting device according to claim 1, wherein said multiple sorting result generation unit generates the at least one of the plurality of sound segment sorting results and the plurality of image segment sorting results by applying the plurality of different operation conditions to change the number of clusters to be obtained as a sorting result to at least one of said sound segment sorting unit and said image segment sorting unit.

13. A sound and image segment sorting device according to claim 1, wherein
the sound segment is a segment where a voice of a person exists in the video, and
said sound segment sorting unit sorts the plurality of sound segments into a plurality of sound segment groups based on a likelihood that voices belong to the same person.

14. A sound and image segment sorting device according to claim 1, wherein
the image segment is a segment where a face of a person exists in the video, and
said image segment sorting unit sorts the plurality of image segments into a plurality of image segment groups based on a likelihood that faces belong to the same person.

15. A sound and image segment sorting device according to claim 2, wherein said sorting result output unit further outputs an association pattern between the sound cluster and the image cluster when said cluster association unit has calculated the sorting result comparative score for the selected sorting result pair.

16. A sound and image segment sorting device according to claim 1, wherein
said multiple sorting result generation unit is configured to generate at least one of the plurality of sound segment sorting results each including different number of sound clusters and the plurality of image segment sorting results each including different number of image clusters by applying the plurality of operation conditions each producing different number of clusters as the sorting results to at least one of said sound segment sorting unit and said image segment sorting unit.

17. A sound and image segment sorting method comprising:
a sound segment sorting step of sorting a plurality of sound segments contained in a video based on an arbitrary operation condition and generates sound segment sorting results, each of said sound segment sorting results being a collection of sound clusters including at least one sound cluster as an element, and each of said at least one sound cluster being a collection of sound segments determined to be sound phenomena representing a same object;
an image segment sorting step of sorting a plurality of image segments contained in the video based on an arbitrary operation condition and generates image segment sorting results, each of said image segment sorting results being a collection of image clusters including at leas one image cluster as an element, and each of said at least one image cluster being a collection of image segments determined to be image phenomena representing a same object;
a multiple sorting result generation step of generating at least one of a plurality of sound segment sorting results and a plurality of image segment sorting results by applying a plurality of different operation conditions to at least one of the sound segment sorting step and the image segment sorting step when generating the sound segment sorting result and the image segment sorting result by applying the operation conditions to at least one of the sound segment sorting step and image segment sorting step;
a sorting result pair generation step of generating a plurality of sorting result pairs each including one sound segment sorting result and one image segment sorting result based on the plurality of sound segment sorting results and the plurality of image segment sorting results obtained in the multiple sorting result generation step;
a sorting result comparative score calculation step of calculating, for each sorting result pair, a sorting result comparative score representing a fitness between a sound segment sorting result and an image segment sorting result included in the sorting result pair; and
a sorting result output step of selecting a sorting result pair having a high fitness among said plurality of sorting result pairs based on the sorting result comparative score and outputting a sound segment sorting result and an image segment sorting result included in the sorting result pair.

18. A non-transitory computer-readable recording medium storing a program that causes a computer to execute:
a sound segment sorting step of sorting a plurality of sound segments contained in a video based on an arbitrary operation condition and generates sound segment sorting results, each of said sound segment sorting results being a collection of sound clusters including at least one sound cluster as an element, and each of said at least one sound cluster being a collection of sound segments determined to be sound phenomena representing a same object;
an image segment sorting step of sorting a plurality of image segments contained in the video based on an arbitrary operation condition and generates image segment sorting results, each of said image segment sorting results being a collection of image clusters including at least one image cluster as an element, and each of said at least one image cluster being a collection of image segments determined to be image phenomena representing a same object;
a multiple sorting result generation step of generating at least one of a plurality of sound segment sorting results and a plurality of image segment sorting results by applying a plurality of different operation conditions to at least one of the sound segment sorting step and the image segment sorting step when generating the sound segment sorting result and the image segment sorting result by applying the operation conditions to the sound segment sorting step and image segment sorting step;
a sorting result pair generation step of generating a plurality of sorting result pairs each including one sound segment sorting result and one image segment sorting result based on the plurality of sound segment sorting results and the plurality of image segment sorting results obtained in the multiple sorting result generation step;
a sorting result comparative score calculation step of calculating, for each sorting result pair, a sorting result comparative score representing a fitness between a sound segment sorting result and an image segment sorting result included in the sorting result pair; and
a sorting result output step of selecting a sorting result pair having a high fitness among said plurality of sorting result pairs based on the sorting result comparative score and outputs a sound segment sorting result and an image segment sorting result included in the sorting result pair.

* * * * *